United States Patent [19]

Sagues

[11] Patent Number: 4,474,155

[45] Date of Patent: Oct. 2, 1984

[54] GOVERNING CONTROL FOR INTERNAL COMBUSTION ENGINE

[75] Inventor: Paul Sagues, Berkeley, Calif.

[73] Assignee: Mikuni Kogyo Kabushiki Kaisha, Tokyo, Japan

[21] Appl. No.: 492,797

[22] Filed: May 9, 1983

[51] Int. Cl.3 ............................................. B60K 31/00

[52] U.S. Cl. ..................................... 123/352; 123/333

[58] Field of Search ............... 123/352, 350, 478, 480, 123/486, 333

[56] References Cited

U.S. PATENT DOCUMENTS

| | | | |
|---|---|---|---|
| 4,155,419 | 5/1979 | Mann | 123/352 |
| 4,169,437 | 10/1979 | Fleischer | 123/352 |
| 4,196,466 | 4/1980 | Noddings et al. | 123/352 |
| 4,211,193 | 7/1980 | Cox et al. | 123/352 |
| 4,273,208 | 6/1981 | Liermann | 123/352 |
| 4,307,690 | 12/1981 | Rau et al. | 123/352 |
| 4,313,408 | 2/1982 | Collonia | 123/352 |
| 4,354,467 | 10/1982 | Noddings et al. | 123/352 |
| 4,419,729 | 12/1983 | Krieder | 123/352 |
| 4,425,888 | 1/1984 | Engel et al. | 123/352 |
| 4,426,980 | 1/1984 | Eisele et al. | 123/352 |

*Primary Examiner*—Raymond A. Nelli

*Attorney, Agent, or Firm*—Owen, Wickersham & Erickson

[57] ABSTRACT

A governor control system for an internal combustion engine of the type wherein the operator's fuel command signals are furnished to a computer which controls the amount of fuel flow to the engine and calculates the amount of airflow necessary to provide a perdetermined air/fuel ratio in a fuel-air section. The computer includes a second section for receiving engine status signals relative to actual engine operating conditions and utilizing them to provide an output equivalent to a related maximum allowable engine speed. A third or governor control section in the computer compares output from the second section and also a signal related to the present actual engine speed to produce an error signal which is utilized to produce a fuel rate signal commensurate with the maximum allowable engine speed. A selector compares the fuel rate signal and the operator's fuel command signal to produce a modified fuel command signal to the fuel-air control section of the computer which will not cause the engine to exceed its predetermined maximum allowable limit.

12 Claims, 3 Drawing Figures

GOVERNING CONTROL FOR INTERNAL COMBUSTION ENGINE

FIELD OF THE INVENTION

This invention relates to an electronically controlled fuel system for an internal combustion engine and more particularly to such a system capable of governing the speed or power output level of the engine under various operating conditions.

BACKGROUND OF THE INVENTION

Engine governing devices previously used for internal combustion engines, to prevent excessive wear and engine damage, have been of two general types. A first type operated to shut off the ignition and prevent the spark plugs from igniting when overspeed was detected, while a second type reduced or eliminated fuel flow to the engine. Both of these approaches to engine governing suffered from the same problem, namely, they both failed to maintain the desired air/fuel ratio during the governing time. With the first type of governor, described above, the effect of shutting off the ignition allowed the combustible fuel/air mixture to pass out of the engine unburned. This resulted in a harmful and potentially dangerous mixture being expelled from the engine exhaust system. Hydrocarbon emissions were often extremely high, while a dangerous potential exists for igniting the mixture accidentally and causing backfiring or a fire. With the second type of governing, a shut off or reduction in fuel flow upon detection of overspeed also created severe problems. Since the fuel reduction was not accompanied by a similar airflow reduction, the air/fuel ratio became uncontrolled, resulting in the generation of harmful or dangerous emissions. Although cutting the fuel entirely reduced emissions, this approach created two other problems. First, the engine lost all power when fuel was cut entirely off. When the engine speed dropped, the governor turned on fuel again. When repeated, this caused the engine to be cycled from minimum to maximum power constantly. The result was poor performance and potential engine and vehicle damage. The second problem of the fuel-cut strategy was that in the transients between minimum and maximum power, the air/fuel ratio was incorrect, thereby resulting in the generation of substantial harmful emissions.

In an electronic engine control system wherein a driver's command from the accelerator pedal is furnished to a computer control unit instead of being linked directly to the throttle, the aforesaid problems of governor control become even more complex. The present invention effectively solves these problems in a computer controlled system for a fuel injected internal combustion engine wherein airflow is controllable to match the fuel supplied as a result of a modified fuel command signal.

Another important aspect of the engine governing problem is that of determining the maximum allowable speed limits for different engine operating and environmental conditions. Although a single fixed maximum engine speed value could be selected, it might not be ideally applicable for varying abnormal conditions, e.g., low temperature. Thus, it is preferable that the governing system automatically select the safe operating maximum speed level and keep it up to date with changing engine and environmental conditions. The present invention also solves this problem by providing a system whereby the governed speed will never exceed the presently determined maximum allowable speed of the engine.

It is, therefore, a general object of the present invention to provide an improved governing control for a fuel injected internal combustion engine in order to reduce the possibility of damaging the engine through intentional or benign abuse.

Another object of the present invention is to provide a governing system for a computer controlled internal combustion engine wherein airflow is controllable to match the fuel supplied as a result of a modified fuel command signal that is generated to provide an engine speed below the maximum allowable speed.

Another object of the present invention is to provide an improved governing control system for a fuel injected internal combustion engine wherein engine speed is controlled by automatically varying fuel flow rate and airflow to maintain an optimum air/fuel ratio so that no harmful emissions are generated and adequate engine power is maintained during the governed period.

Yet another object of the invention is to provide a governing system for an internal combustion engine wherein the maximum allowable engine speed for the existing engine condition is first ascertained automatically and also the fuel flow rate necessary to maintain such maximum allowable speed, the latter being used only if the simultaneous driver command fuel flow rate is higher.

Another object of the invention is to provide an automatic engine control system with an engine control unit which utilizes driver command signals equivalent to a desired fuel flow rate while automatically controlling airflow proportional to the fuel flow and which automatically determines a maximum allowable engine speed and then prevents the driver command signals from exceeding the maximum allowable speed despite the magnitude of driver command signals received.

SUMMARY OF THE INVENTION

The principles of the present invention are applicable to solve the governing problem in a fuel injection type internal combustion engine wherein fuel command signals are generated by the operator's actuation of an accelerator pedal and are supplied to a computer. Within an air conduit to the engine is a rotatable throttle plate connected to an actuator and thereby movable to determine the volume of air supplied to the engine. Mounted within the conduit is one or more fuel injection devices controlled by the computer output. Pressure sensors located upstream and downstream from the throttle plate provide input signals to the computer, which in turn controls the throttle actuator and thus, the amount of airflow. Computer control of the throttle actuator is based on the precise amount of airflow required to provide a desired optimum air/fuel ratio.

In accordance with the invention, the governing of a fuel injected internal combustion engine with a computer control system as described, is accomplished by first establishing automatically what the maximum allowable engine speed should be. This upper speed limit is a function of many variables which include but are not limited to engine temperature, intake manifold pressure, engine oil pressure, or the mechanical status of the transmission. In the present governing system, this maximum speed limit is determined and continuously upgraded by measuring one or more of the aforesaid variables and supplying data to an engine control computer. Within the computer, predetermined one or two dimensional arrays or tables of engine parameters versus associated maximum allowable engine speeds are stored. Thus, upon receipt of the engine parameter inputs, the computer provides an appropriate output signifying the precise maximum allowable engine speed for the prevailing engine conditions. Also within the computer is a governing section which receives the determined maximum allowable engine speed and compares it with the actual present engine speed to produce an error signal. This error signal is provided to a governor servo which determines what fuel flow (SQF) will be necessary to achieve the maximum allowable engine speed. This governor servo output is compared with the driver fuel command. If the latter is less than the governor servo output, then no governing is needed, and the driver fuel command signal is used to determine appropriate airflow. However, if the driver command is larger than the governor servo output, then the latter is used to determine airflow and thereby control engine speed. When the driver reduces the fuel command to a point where it is less than the governor servo output, the driver command signals are again used to control engine speed in the normal operating manner.

Other objects, advantages and features of the invention will become apparent from the following detailed description of one embodiment presented with the accompanying drawing.

DETAILED DESCRIPTION OF EMBODIMENT

Figure 1:
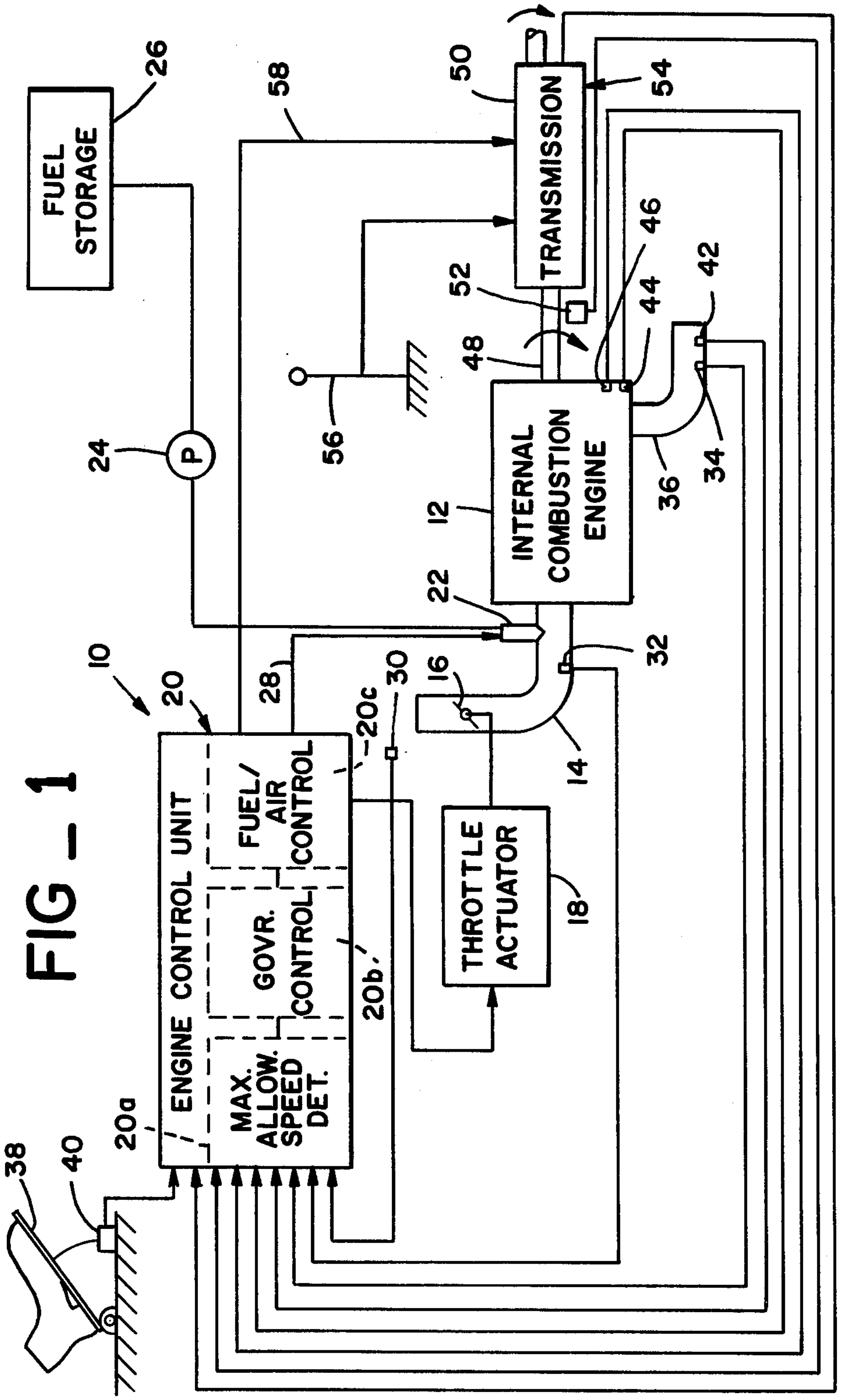
FIG. 1 is a block diagram of an engine control system utilizing a governor control according to the present invention.

With reference to the drawing, FIG. 1 shows schematically a control system 10 for an internal combustion engine 12, that incorporates automatic governing of the engine speed in accordance with the invention. In the embodiment shown, the governing control system is the fuel priority engine air control (EAC) type, but the invention disclosed herein could be applied to other types of electronically or computer controlled "drive by wire" engine control systems.

As illustrated, the engine is provided with an intake manifold 14 within which is rotatably mounted a movable throttle plate 16. The angular position of the throttle plate is controlled by a throttle actuator 18, such as a stepping motor. Commands or control signals to the actuator 18 for positioning the throttle plate originate from an engine control unit 20 which is essentially a preprogrammed digital computer. As indicated, the engine control unit includes a maximum allowable speed determination section 20*a*, a governor control section 20*b* and the main fuel-air control section 20*c*. Fuel for the engine is supplied by one or more injectors, indicated by the numeral 22, which are attached to the air manifold in such a manner to cause air and fuel to be mixed together before entering each cylinder of the engine. Fuel to the injector(s) is supplied via a pump 24 from a fuel tank 26. Each injector 22 receives a command signal from the engine control unit 20 via lead 28 which modulates the injector 22 and causes it to dispense the proper amount of fuel into the air stream in the manifold. The precise amount of fuel supplied for each cylinder firing is determined by a square wave pulse signal produced from the fuel-air control section 20*c* of the engine control unit 20 and sent via the lead 28. The proper amount of air that must be furnished to provide an ideal air/fuel ratio is determined by the computer which provides the appropriate control signal to the throttle actuator 18, thereby moving the throttle plate to provide the proper airflow. The amount of air flowing in the intake manifold is constantly measured by upstream and downstream pressure sensors 30 and 32 which constantly furnish data to the fuel-air control section 20*c* of the engine control unit. A suitable oxygen sensor 34 in the engine exhaust pipe 36 provides another input to the computer that is used to compute the proper airflow. The precise manner in which the computer determines the proper amount of airflow for a particular fuel flow rate is not part of this invention, but is described in greater detail in U.S. patent application Ser. No. 228,973, filed Jan. 27, 1981, and having the same assignee as the present application.

In the EAC type system shown, the speed of the engine and thus the fuel flow rate desired by the operator, is controlled by actuation of an accelerator foot pedal 38. The precise position of the pedal is determined by an encoder 40 or some other form of position indicator which sends appropriate pedal position signals to the engine control unit. In order to prevent the operator's movement of the foot pedal to cause a safe engine speed to be exceeded, the control unit 20 includes the governor control section 20*b* which automatically limits the fuel command signals in accordance with the invention.

The maximum allowable engine speed used with the governor control section can be preselected as a fixed value based on design factors. However, for different engine operating conditions, the maximum allowable speed limit will vary, and the present invention takes this into account and enables it to be determined by section 20*a* of the engine control unit 20. For example, the maximum allowable speed will change with engine temperature. A cold engine may be overspeed damaged at a lower speed than a warm engine. Thus, the maximum allowable speed should be increased as engine temperature increases. Similarly, if the engine is too hot, engine lubrication could break down, and, therefore, the maximum allowable speed limit should be decreased at abnormal high engine temperatures.

Other engine operating parameters will affect the maximum allowable speed limit. For example, the engine could be damaged more easily at high engine load conditions and in this case the maximum allowable engine speed could be made a function of water temperature and engine load. One variable which roughly measures load is manifold vacuum.

Another factor is properly governing an engine is to make the maximum allowable engine speed change based upon how long the engine is held at a high speed. This is because most engines are designed to operate for short periods above their "red line" or designed speed limit. Sustained operation near the red line values may, however, cause engine damage as temperatures within the engine increase rapidly and lubrication wears thin. For this reason, it is desirable to make the maximum allowable engine speed a function of the length of time that the engine is in a high speed condition. For example, the engine may be allowed to momentarily reach 6000 rpm, but if the drive fuel command requested sustained operation at 6000 rpm, the governor would intercede and reduce the fuel to the engine such that, after a preset period (e.g., three seconds), the engine speed would be reduced from 6000 rpm to 4500 rpm. This would be implemented as follows, using a sample time which is started when the engine exceeds 4500 rpm. While the timer is running, the maximum allowable engine speed is 6000 rpm. When the timer expires, the maximum allowable engine speed is reduced to 4500 rpm.

Establishment of the proper maximum allowable engine speed, to use for the governing control under different engine conditions, is accomplished within the engine control system which is furnished with inputs from various engine status sensors. Within the computer memory are provided one or more arrays which relate various engine parameters to a particular maximum allowable speed. For example, if only a temperature criterion is to be used, a one dimensional table of temperatures with associated maximum allowable temperatures is provided. If two or more engine variables are to be used, such as temperature and manifold vacuum, a two or more dimensional array within the computer memory will be provided and inputs from the two or more variables will produce a predetermined associated maximum speed value.

Thus, as shown in FIG. 1, the engine control unit is provided with inputs from the oxygen sensor 34, as previously described, and also from an exhaust temperature sensor 42 in the engine exhaust pipe. The latter may be used as another indicator of engine load. A sensor 44 providing actual engine temperature and another sensor 46 providing engine oil pressure, furnish additional inputs to the engine control unit. The aforesaid sensors provide analog signals and are, therefore, processed through an analog to digital converter (not shown) before being used within the computer.

The engine output shaft 48 may be connected to a transmission 50. On the engine shaft is a speed sensor 52 connected to the engine, and within the transmission is an appropriate position sensor 54 which provides a signal indicating whether an operating lever 56 of the transmission is in the "in" or "out" of gear position. When the operating lever 56 is moved to the "in" gear position, the actual engine speed from sensor 52 is compared with a stored predetermined speed value above which the transmission should not be engaged. If the actual speed is less than the transmission speed limit, the transmission will be enabled to operate normally via a lead 58 connected to an appropriate actuator or release valve within the transmission. If the actual speed is greater when the operating lever is moved, the transmission will not become enabled until the engine speed falls below the stored maximum limit speed.

Now, with the engine in operation, the aforesaid sensors are constantly furnishing status information to the engine control unit 20 and within the maximum allowable speed determination section 20*a* this information is applied to the various arrays or tables related to maximum allowable speed in the computer memory. From this status information, the computer internally produces a maximum allowable speed value which is furnished to the governing section 20*b* of the engine control unit.

Figure 2:
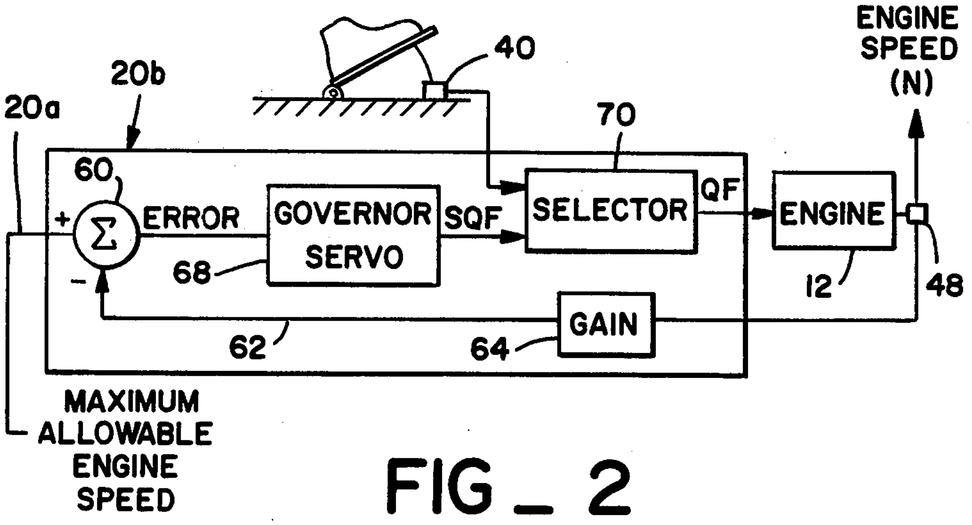
FIG. 2 is a block diagram of the governor servo section for the engine control unit shown in FIG. 1.
Figure 3:
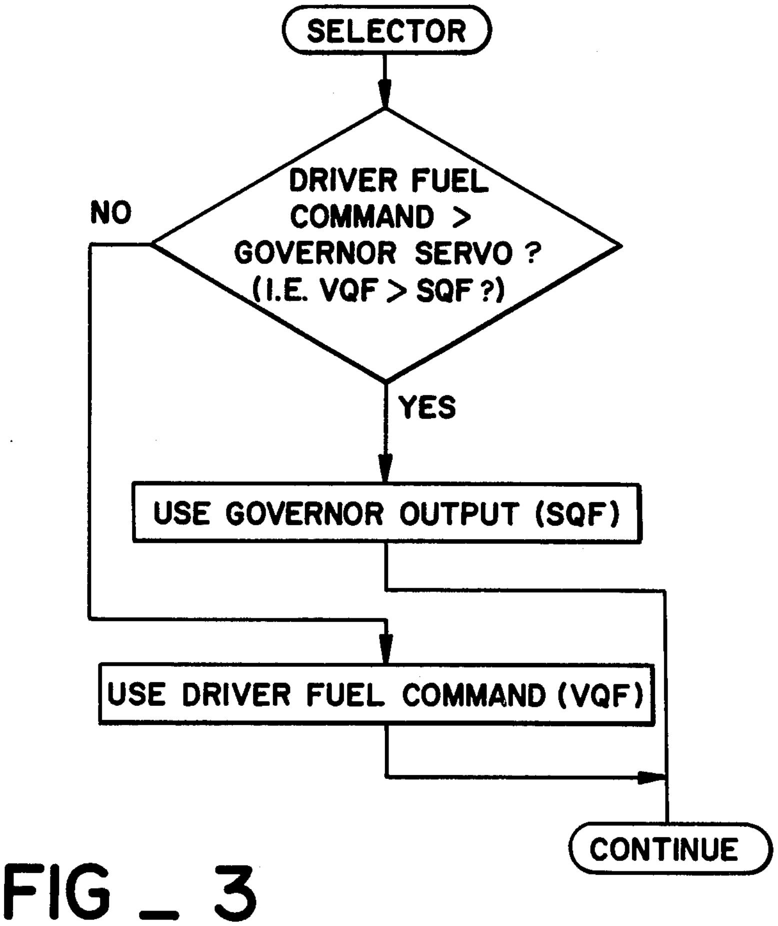
FIG. 3 is a flow diagram representing the operation of the governor servo section of FIG. 2.

Turning to FIG. 2, a block diagram is shown of the governing section 20*b* of the engine control unit 20. Here, a summation gate 60 receives an input from the engine status section 20*a* which designates the present maximum allowable engine speed based on existing engine conditions, as previously described. This gate also receives, via a lead 62, a signal equivalent to the actual engine speed. This latter signal, in digital form, is furnished from a suitable sensor 48 (e.g., on the engine output shaft) through a control gain circuit 64 in the lead 62. An error signal produced by the summation gate 60 as a result of the aforesaid two inputs is furnished to a governor servo 68, which is a conventional proportional-integral-derivative (PID) servo circuit that has been programmed to produce an output SQF commensurate with the amount of fuel necessary to attain the maximum allowable engine speed. The output signal SQF is supplied to a selector gate 70 which also receives the operator's driver fuel command signal VQF from the accelerator pedal. Within the selector, the driver fuel command signal is compared with the output SQF from the governor servo, as shown by the flow diagram of FIG. 3. If the driver fuel command is less than the governor output, then no governing is needed and the driver fuel command is used. If, however, the driver fuel command is larger than the governor output, then the governor output is used because use of the driver fuel command would result in an engine overspeed condition. At some point, the driver will reduce the fuel command to a point where it is less than the governor output. At this point, the driver fuel command is again used, and the driver again controls the engine speed.

As seen above, the present engine governing system operates in generally two phases. First, it utilizes various engine parameter inputs to ascertain automatically, store and constantly update the maximum allowable speed limit for the engine. Secondly, it determines what fuel flow rate (SQF) would be necessary to attain the maximum speed and instantly compares this with the fuel command signal (QF), so that only an acceptable fuel rate signal is selected and furnished to the fuel-air logic section of the computer where the proper matching airflow rate is determined. Thus, the governed speed below the maximum limit is always attained with precisely the proper air/fuel ratio, so that maximum engine power and efficiency are available and no unburnt fuel or excessive deleterious emissions are produced.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

It is claimed:

1. A fuel-controlled and speed governing system for an internal combustion engine of the type wherein fuel command signals produced by an operator's movement of an accelerator device are furnished to a computer, comprising a first section of said computer having means for controlling the amount of fuel flow to the engine and for calculating the amount of airflow necessary to provide a predetermined air/fuel ratio, a second section of said computer continuously receiving engine status signals relative to actual engine operating conditions, said second section also including stored table means which relate preselected engine status conditions to maximum allowable engine speeds that have been predetermined for such conditions and comparator means for comparing said engine status signals with said stored table means to provide an output signal equivalent to a related maximum allowable engine speed;

engine speed sensing means for sensing continuously the actual speed of the engine, a third section in said computer connected to said engine speed sensing means for providing governor control means for comparing said output signal to a signal related to the present actual engine speed to produce an error signal, said third section having a governor servo for receiving said error signal and having means for utilizing it to produce a fuel rate signal commensurate with the amount of fuel necessary to attain the maximum allowable engine speed, and a selector means for comparing said fuel rate signal and the fuel command signal from said accelerator device and selecting the lesser value of the two signals to produce a determinative fuel command signal to send to said fuel-air control section that will cause the engine not to exceed the predetermined maximum allowable limit, said determinative fuel command signal resulting in the fuel flow being applied to the engine and the air flow being applied to the engine according to said predetermined air/fuel ratio.

2. The system as described in claim 1 wherein said governor servo is a proportional, integral, derivative (PID) controller.

3. The system as described in claim 1 wherein the engine status signal is derived from a temperature sensor in the engine and said second computer section includes a stored table means that relates each of an array of engine operating temperatures to a predetermined maximum allowable engine speed.

4. The system as described in claim 1 wherein the engine status signals are derived from an engine oil pressure sensor and said second computer section includes at least one stored table that relates each of an array of engine oil pressure values to a predetermined maximum allowable engine speed.

5. The system as described in claim 1 wherein the engine status signals are derived from a vacuum pressure sensor and said second computer section includes at least one stored table that relates each of an array of vacuum pressure values to a predetermined maximum allowable engine speed.

6. A method for governing the speed of an internal combustion engine comprising the steps of:

providing a maximum allowable speed limit in the form of a first digital signal;

providing the actual existing engine speed in the form of a second digital signal;

comparing the first and second digital signals to provide an error signal;

using said error signal to determine an associated fuel flow signal;

providing a driver command fuel flow signal proportional to movement of an accelerator device by an operator;

comparing said associated fuel flow signal with said driver command signal and using the smaller of the two signals to determine the amount of fuel flow for the engine.

7. The method as described in claim 1 wherein said maximum allowable speed is determined by:

(a) sensing one or more engine parameters to provide engine status signals;

(b) supplying said status signals to a computer having a memory that includes one or more arrays or tables of status conditions with associated maximum allowable speed values;

(c) selecting a maximum allowable speed value commensurate with the furnished status conditions to thereby generate said first digital signal.

8. A speed-governing system for an internal combustion engine in which optimum fuel-air ratios are maintained as the speeds change, while said speeds are prevented from exceeding a maximum allowable speed which itself varies in accordance with a particular engine condition, including in combination:

fuel injection means for supplying fuel to said engine, air throttle means for supplying air to said engine in varying amounts, engine-condition sensing means for continuously sensing said particular engine condition that is related to the maximum allowable engine speed, a computer associated with said engine having calculating means and comparator means, storage means associated with said computer for storing the data relating the value of the maximum allowable speed to each value of said engine condition, engine speed sensing means for continuously sensing the actual speed of the engine, driver-responsive accelerator means for transmitting a driver fuel command signal to said computer, said calculating means in said computer being connected to said condition sensing means and to said storage means for determining at every instant the maximum allowable speed corresponding to the then prevailing engine condition and producing a maximum speed signal, said comparator means comparing the sensed actual speed with the then-current maximum speed signal and generating a difference signal therefrom, said calculating means also being connected to said comparator means for calculating the fuel requirements corresponding to said difference signal and for generating a maximum-allowable fuel requirement signal therefrom, said comparator means in said computer comparing said driver fuel command signal with said maximum-allowable fuel requirement signal to determine which is the lesser of the two and transmitting the lesser fuel signal, said calculating means in said computer receiving said lesser fuel signal and calculating therefrom the amount of air flow needed to provide the optimum fuel-air flow ratio corresponding to the amount of fuel required by said lesser fuel signal, fuel injection actuator means responsive to said lesser fuel signal and connected to said fuel injector means for injecting that amount of fuel, and air throttle actuator means responsive to said calculated amount of air flow and connected to said air throttle means for effectuating that amount of air, said engine condition sensing means, said engine speed sensing means, and said driver-responsive accelerator means continuously acting to update said comparator means and said calculator means for supplying the proper amount of fuel and air to said engine at every instant.

9. The system of claim 8 wherein said particular engine condition is engine temperature and said engine-condition sensing means is an engine temperature sensor.

10. The system of claim 9 wherein said system includes timing means for determining the length of time at which a high engine speed is being maintained, pertinent time data being stored in said storage means, and means for causing reduction in maximum allowable engine speed when the time factor indicates such reduction is in order.

11. The system of claim 9 having manifold vacuum sensing means and relationships between manifold vacuum and temperature and maximum allowable speed are stored in said storage means, said maximum allowable speed being thereby determined by both temperature and manifold vacuum.

12. A speed-governing method for an internal combustion engine having an accelerator pedal generating a driver fuel command signal and having a computer receiving that signal and maintaining optimum fuel-air ratios as the speeds change, while said speeds are prevented from exceeding a maximum allowable speed which itself varies in accordance with a particular engine condition, said computer having storage means for storing the data relating the value of the maximum allowable speed to each value of said engine condition, continuously sensing said particular engine condition that is related to the maximum allowable engine speed, determining at every instant the maximum allowable speed corresponding to the then prevailing engine condition and producing a maximum speed signal, continuously sensing the actual speed of the engine, comparing the sensed actual speed with the then-current maximum speed signal and generating a difference signal therefrom, calculating the fuel requirements corresponding to said difference signal and generating a maximum-allowable fuel requirement signal therefrom, comparing said driver fuel command signal with said maximum-allowable fuel requirement signal to determine which is the lesser of the two and transmitting the lesser fuel signal, calculating from said lesser fuel signal the amount of air flow needed to provide the optimum fuel-air flow ratio corresponding to the amount of fuel required by said lesser fuel signal, injecting that amount of fuel, supplying to the engine the calculated amount of air corresponding to the amount of fuel injected, and continuously updating according to engine speed, engine condition, and driver fuel command, to supply the proper amount of fuel and air to said engine at every instant.

* * * * *